US010823335B2

(12) United States Patent
Lee et al.

(10) Patent No.: US 10,823,335 B2
(45) Date of Patent: Nov. 3, 2020

(54) SHIP INCLUDING GAS RE-VAPORIZING SYSTEM (71) Applicant: HYUNDAI HEAVY INDUSTRIES CO., LTD., Ulsan (KR)

(72) Inventors: Tae Yeong Lee, Ulsan (KR); Jong Pil Ha, Ulsan (KR); Min Ho Kang, Ulsan (KR); Hee Seung Heo, Ulsan (KR); Seung Wook Yang, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 121 days.

(21) Appl. No.: 16/073,771

(22) PCT Filed: Mar. 30, 2017

(86) PCT No.: PCT/KR2017/003497
§ 371 (c)(1),
(2) Date: Jul. 27, 2018

(87) PCT Pub. No.: WO2017/135804
PCT Pub. Date: Aug. 10, 2017

(65) Prior Publication Data
US 2019/0032852 A1 Jan. 31, 2019

(30) Foreign Application Priority Data

Feb. 1, 2016 (KR) .................. 10-2016-0012477
Apr. 7, 2016 (KR) .................. 10-2016-0042768
(Continued)

(51) Int. Cl.
*F17C 9/02* (2006.01)
*F17C 9/04* (2006.01)
(Continued)

(52) U.S. Cl.
CPC ................ *F17C 9/04* (2013.01); *B63B 25/14* (2013.01); *B63H 21/38* (2013.01); *B63J 4/00* (2013.01);
(Continued)

(58) Field of Classification Search
CPC ........ F17C 9/04; F17C 9/02; F17C 2265/066; F17C 2225/0161; F17C 2223/0161; F17C 2265/05
See application file for complete search history.

(56) References Cited

U.S. PATENT DOCUMENTS

2003/0159800 A1* 8/2003 Nierenberg ............... F17C 5/06
165/41
2009/0193780 A1 8/2009 Faka
(Continued)

FOREIGN PATENT DOCUMENTS

CN 1380966 11/2002
CN 102395508 3/2012
(Continued)

OTHER PUBLICATIONS

KR20030095531 Translation (Year: 2003).*
(Continued)

*Primary Examiner* — Brian M King
(74) *Attorney, Agent, or Firm* — Ladas & Parry, LLP (57) ABSTRACT A ship including a gas re-vaporizing system according to the present invention includes: a ship body; a vaporizer which is arranged in an upper portion of the ship body, and vaporizes liquefied gas and supplies the vaporized liquefied gas to a demander; and a heat source supply apparatus which is arranged inside the ship body and supplies a heat source to the vaporizer.

16 Claims, 8 Drawing Sheets (30) Foreign Application Priority Data

Jul. 20, 2016 (KR) .................. 10-2016-0092196
Jan. 23, 2017 (KR) .................. 10-2017-0010602

(51) Int. Cl.
- *B63J 4/00* (2006.01)
- *B63B 25/14* (2006.01)
- *B63H 21/38* (2006.01)
- *B63J 99/00* (2009.01)

(52) U.S. Cl.
CPC .......... *F17C 9/02* (2013.01); *B63J 2099/003* (2013.01); *F17C 2221/033* (2013.01); *F17C 2223/0161* (2013.01); *F17C 2223/033* (2013.01); *F17C 2223/043* (2013.01); *F17C 2223/047* (2013.01); *F17C 2225/0161* (2013.01); *F17C 2227/0318* (2013.01); *F17C 2227/0332* (2013.01); *F17C 2227/0393* (2013.01); *F17C 2265/022* (2013.01); *F17C 2265/037* (2013.01); *F17C 2265/05* (2013.01); *F17C 2265/066* (2013.01); *F17C 2270/0105* (2013.01)

(56) References Cited

U.S. PATENT DOCUMENTS

| | | | |
|---|---|---|---|
| 2010/0126187 A1 | 5/2010 | Mak | |
| 2014/0352330 A1* | 12/2014 | Baek | F17C 9/02 62/48.1 |

FOREIGN PATENT DOCUMENTS

| | | | |
|---|---|---|---|
| CN | 102639923 | | 8/2012 |
| CN | 103343718 | | 10/2013 |
| JP | 3-25296 | | 2/1991 |
| JP | 2009-529456 | | 8/2009 |
| JP | 2010-58772 | | 3/2010 |
| JP | 2010-523921 | | 7/2010 |
| JP | 2012-524002 | | 10/2012 |
| JP | 2013-511004 | | 3/2013 |
| JP | 2015-13494 | | 1/2015 |
| KR | 20030073975 A | * | 9/2003 |
| KR | 10-0461946 | | 12/2004 |
| KR | 20-0410840 | | 3/2006 |
| KR | 10-0743904 | | 8/2007 |
| KR | 10-2008-0085284 | | 9/2008 |
| KR | 20-2012-0003585 | | 5/2012 |
| KR | 10-2012-0106752 | | 9/2012 |
| KR | 10-2013-0011152 | | 1/2013 |
| KR | 10-1324114 | | 10/2013 |
| KR | 10-2014-0044139 | | 4/2014 |
| KR | 10-2014-0049789 | | 4/2014 |
| KR | 10-2014-0050306 | | 4/2014 |
| KR | 10-1400020 | | 5/2014 |
| KR | 10-2014-0084832 | | 7/2014 |
| KR | 10-1447825 | | 10/2014 |
| KR | 10-2015-0000161 | | 1/2015 |
| KR | 10-2015-0015792 | | 2/2015 |
| KR | 10-2015-0058819 | | 5/2015 |
| KR | 10-2015-0061229 | | 6/2015 |
| KR | 10-2015-0080083 | | 7/2015 |
| KR | 10-2015-0135157 | | 12/2015 |
| KR | 10-2016-0010956 | | 1/2016 |
| KR | 10-1662728 | | 10/2016 |
| KR | 10-2017-0048773 | | 5/2017 |

OTHER PUBLICATIONS

KR20130011152 Translation (Year: 2013).*
Notice of Grant dated Dec. 4, 2017 for Korean Patent Application No. 10-2016-0092189 and its English translation by Global Dossier.
Office Action dated Sep. 15, 2017 for Korean Patent Application No. 10-2016-0092189 and its English translation by Global Dossier.
Notice of Grant dated Nov. 27, 2018 for Korean Patent Application No. 10-2016-0092196 and its English translation by Global Dossier.
Office Action dated Oct. 16, 2018 for Korean Patent Application No. 10-2016-0092196 and its English translation by Global Dossier.
Office Action dated Apr. 19, 2018 for Korean Patent Application No. 10-2016-0092196 and its English translation by Global Dossier.
Office Action dated Oct. 13, 2017 for Korean Patent Application No. 10-2016-0092196 and its English translation by Global Dossier.
Office Action dated May 28, 2019 for Korean Patent Application No. 10-2017-0136542 and its English translation by Global Dossier.
Notice of Grant dated Jun. 25, 2019 for Korean Patent Application No. 10-2017-0136553 and its English translation by Global Dossier.
Office Action dated May 30, 2019 for Korean Patent Application No. 10-2017-0136570 and its English translation by Global Dossier.
Office Action dated Jul. 12, 2019 for Korean Patent Application No. 10-2017-0168587 and its English translation by Global Dossier.
Office Action dated Jul. 23, 2019 for Japanese Patent Application No. 2018-539953 and its English translation by Global Dossier.
Office Action dated Aug. 2, 2019 for Chinese Patent Application No. 201780009022.6 and its English translation by Global Dossier.
International Search Report for PCT/KR2017/003497 dated Jun. 27, 2017 and its English translation from WIPO.
Written Opinion of the International Searching Authority for PCT/KR2017/003497 dated Jun. 27, 2017 and its English machine translation by Google Translate.
Office Action dated Jan. 20, 2020 for Korean Patent Application No. 10-2017-0168587 and its English translation by Google Translate.
Extended European Search Report dated Sep. 10, 2019 for European Patent Application No. 17747847.6.
Office Action dated Oct. 22, 2018 for Korean Patent Application No. 10-2017-0136542 and its English translation by Global Dossier.
Office Action dated Oct. 22, 2018 for Korean Patent Application No. 10-2017-0136553 and its English translation by Global Dossier.
Office Action dated Oct. 22, 2018 for Korean Patent Application No. 10-2017-0136570 and its English translation by Global Dossier.
International Preliminary Report on Patentability (Chapter I) for PCT/KR2017/003497 dated Aug. 7, 2018 and its English Translation from WIPO.
Office Action dated May 6, 2020 for Chinese Patent Application No. 201780009022.6 and its English translation provided by Applicant's foreign counsel.
Office Action dated Jun. 9, 2020 for Korean Patent Application No. 10-2016-0092171 and its English machine translation by Google Translate.

* cited by examiner

SHIP INCLUDING GAS RE-VAPORIZING SYSTEM

CROSS-REFERENCE TO RELATED APPLICATIONS

This application is the U.S. National Stage of International Patent Application No. PCT/KR2017/003497 filed on Mar. 30, 2017, which claims the priority to Korean Patent Application No. 10-2016-0012477 filed in the Korean Intellectual Property Office on Feb. 1, 2016, Korean Patent Application No. 10-2016-0042768 filed in the Korean Intellectual Property Office on Apr. 7, 2016, Korean Patent Application No. 10-2016-0092196 filed in the Korean Intellectual Property Office on Jul. 20, 2016, and Korean Patent Application No. 10-2017-0010602 filed in the Korean Intellectual Property Office on Jan. 23, 2017, the entire contents of which are incorporated herein by reference.

TECHNICAL FIELD

The present invention relates to a ship including a gas re-vaporizing system.

BACKGROUND ART

In general, it is known that Liquefied Natural Gas (LNG) is clean fuel and reserves of LNG are larger than oil reserves, and the amount of LNG used is sharply increased according to the development of oil drilling and transport technologies. It is general that LNG is stored in a liquid state by decreasing a temperature of methane that is a main component to a temperature of −162° C. or lower at 1 atmosphere, and a volume of liquefied methane is about 1/600 of a volume of methane in a gas state that is a standard state, and specific gravity of liquefied methane is about 0.42, which is ½ of specific gravity of crude oil.

LNG is liquefied and transported, and then is vaporized and used at a used place by easiness of the transportation. However, due to natural disasters and a terror risk, there is a concern that LNG vaporizing equipment is installed on land.

Accordingly, instead of a liquefied natural gas re-vaporizing system installed on land in the related art, equipment, in which a re-vaporizing apparatus is installed in an LNG carrying vessel carrying LNG and vaporized natural gas is supplied to land, is in the limelight.

In an LNG re-vaporizing apparatus system, LNG stored in a liquefied gas storage tank is pressurized by a boosting pump and is sent to an LNG vaporizer, and the LNG is vaporized to NG in the LNG vaporizer and is sent to a demander on land. Here, large energy is required in a process of heat exchange, in which a temperature of LNG is increased in the LNG vaporizer. Accordingly, in order to solve the problem in that energy used in the process is inefficiently exchanged and is wasted, research on various heat exchange technologies for efficient re-vaporization has been conducted.

DISCLOSURE

Technical Problem

The present invention is conceived to improve the related art, and an object of the present invention is to provide a ship including a gas re-vaporizing system, which is capable of maximizing efficiency of re-vaporization of liquefied gas.

Technical Solution

A ship including a gas re-vaporizing system according to the present invention includes: a ship body; a vaporizer which is arranged in an upper portion of the ship body, and vaporizes liquefied gas and supplies the vaporized liquefied gas to a demander; and a heat source supply apparatus which is arranged inside the ship body and supplies a heat source to the vaporizer.

Particularly, the ship may further include at least one deck which vertically divides an internal space of the ship body.

Particularly, the heat source supply apparatus may include: a heat source pump, which supplies the heat source; a seawater heat exchanger, which heat exchanges the heat source and seawater; and a heat source circulation line, which is provided with the heat source pump and the seawater heat exchanger, and the heat source pump and the seawater heat exchanger may be sectioned and disposed at an upper side or a lower side by the deck.

Particularly, the ship may further include: a seawater pump, which supplies the seawater to the seawater heat exchanger; and a seawater line, in which the seawater flows and which is provided with the seawater pump and the seawater heat exchanger, in which the heat source circulation line may be formed to have a smaller diameter than a diameter of the seawater line.

Particularly, the seawater line may have one end, which is connected to a seawater inlet formed on a lateral surface of the ship body, and the other end, which is connected to a seawater outlet formed on a lateral surface of the ship body, and the heat source supply apparatus may be disposed in a section inside the ship body, in which the seawater outlet is provided.

Particularly, the seawater pump may be disposed at a stern side inside the ship body.

Particularly, the ship may further include a steam heat exchanger, which heat exchanges the heat source and steam, in which the heat source pump, the seawater heat exchanger, or the steam heat exchanger may be sectioned and disposed at an upper side or a lower side by the deck.

Particularly, the ship may further include: a boiler, which generates the steam and is disposed in an engine room inside the ship body; and a steam line, which connects the steam heat exchanger and the boiler so that the steam circulates the steam heat exchanger and the boiler, in which the steam line may be arranged inside a hull formed in at least a part of a ship bottom of the ship body.

Particularly, the steam may be heat-exchanged with the heat source next to the seawater.

Particularly, the heat source supply apparatus may be manufactured in a module type so as to include the heat source pump, the seawater heat exchanger, or the steam heat exchanger.

Particularly, the heat source supply apparatus may be disposed at a stern side inside the ship body.

Particularly, the heat source supply apparatus may be disposed at an internal side of the ship body.

Particularly, the heat source supply apparatus may be disposed on a lateral surface of an engine room, which is disposed inside a stern of the ship body.

Particularly, the heat source may be a non-explosive refrigerant.

Particularly, the heat source may be glycol water.

Particularly, the heat source supply apparatus may include a pressure maintaining device, which maintains a pressure of a heat source flowing within the heat source circulation line, and the pressure maintaining device may maintain the pressure of the heat source by using inert gas.

Advantageous Effects

The ship including the gas re-vaporizing system according to the present invention has an effect in that it is possible to maximize efficiency of re-vaporization of liquefied gas.

BEST MODE

An object, specific advantages, and novel characteristics of the present invention will be more apparent from the detailed description and exemplary embodiments below in connection with the accompanying drawings. It should be noted that in giving reference numerals to elements of each drawing in the present specification, like reference numerals refer to like elements even though like elements are shown in different drawings. Further, in the description of the present invention, when a detailed description of a related publicly known function or constituent element is determined to unnecessarily make the subject matter of the present invention unclear, the detailed description and a detailed illustration thereof will be omitted.

Hereinafter, in the present specification, liquefied gas may be used as a meaning collectively including all of the gas fuels generally stored in a liquid state, such as Liquefied Natural Gas (LNG) or Liquefied Petroleum Gas (LPG), ethylene, and ammonia, and gas, which is not in a liquefied state by heating or pressurizing, may be expressed by liquefied gas for convenience. The same may also be applied to Boil-Off Gas (BOG). Further, the LNG may be used as a meaning collectively including Natural Gas (NG) in a super-critical state, as well as a liquid state, and evaporation may be used as a meaning including liquefied BOG, as well as BOG in a gas state.

Hereinafter, an exemplary embodiment of the present invention will be described in detail with reference to the accompanying drawings.

Figure 1:
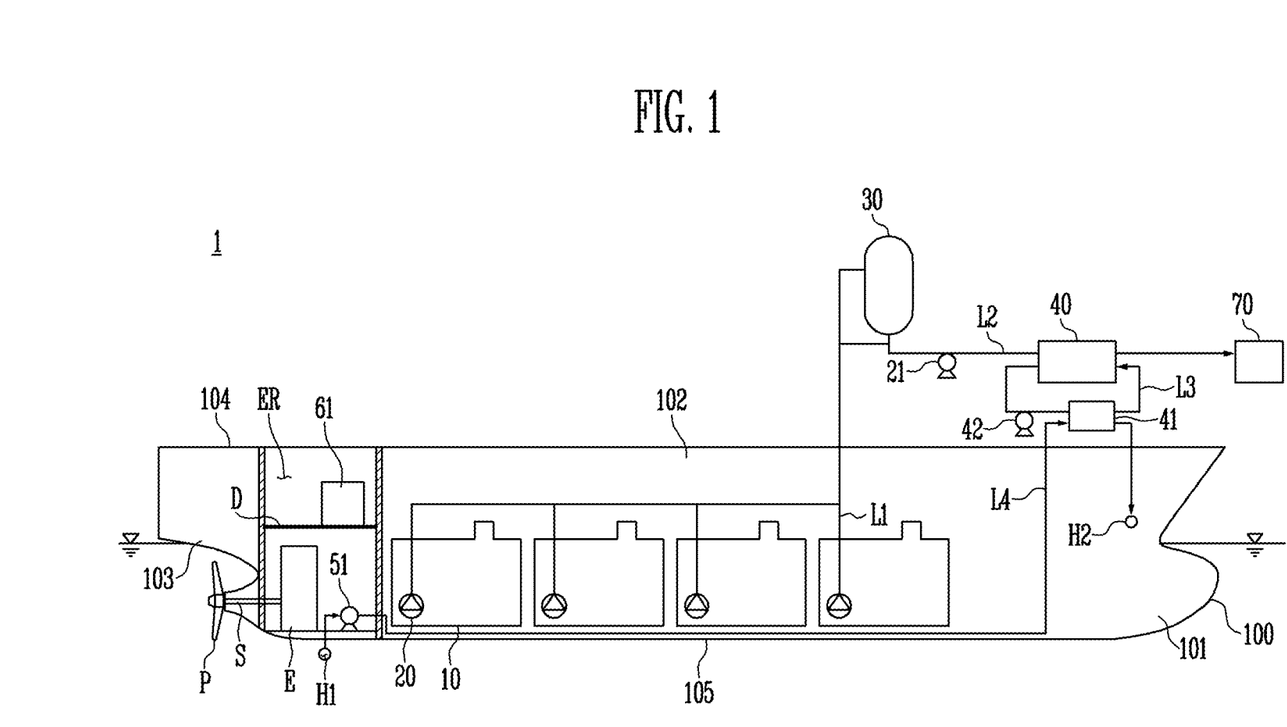
FIG. 1 is a conceptual diagram of a ship including a gas re-vaporizing system according to an exemplary embodiment in the related art.

FIG. 1 is a conceptual diagram of a ship including a gas re-vaporizing system according to an exemplary embodiment in the related art.

As illustrated in FIG. 1, a gas re-vaporizing system 1 in the related art includes a storage tank 10, a feeding pump 20, a buffer tank 30, a vaporizer 40, and a demander 70.

The gas re-vaporizing system 1 in the related art uses a scheme of extracting liquefied gas in a liquid state from the liquefied gas storage tank 10 through the feeding pump 20, pressurizing the extracted liquefied gas with a boosting pump 21 via the buffer tank 30, heats and re-vaporizes the liquefied gas with a heat source in the vaporizer 40, and supplying the re-vaporized gas to the first demander 70.

In the gas re-vaporizing system 1, the plurality of liquefied gas storage tanks 10 is disposed inside a ship body 100, but the re-condenser 30, the boosting pump 21, and the vaporizer 40 are disposed inside a re-vaporizing unit room 1000 disposed at an upper side of an upper deck 104 of a stem 101 and are driven.

Since liquefied gas is formed of an explosive material, the configurations of the re-condenser 30, the boosting pump 21, and the vaporizer 40 are prevented from being provided inside the ship body 100, which has weak circularity and is closed, to secure safety.

The vaporizer 40 receives a first heating medium through a seawater heat exchanger 41 and a heat source pump 42 provided on a heat source circulation line L3 and re-vaporizes liquefied gas, and explosive refrigerant, such as propane or butane, is used as the first heating medium. Accordingly, similar to the configurations of the gas re-vaporizing system 1, the seawater heat exchanger 41 and the heat source pump 42 supplying the heat source to the vaporizer 40 are disposed at the upper side of the upper deck 104 and are driven.

In contrast, a seawater pump 51, which is a configuration of supplying seawater to the seawater heat exchanger 41, is inevitably located in an engine room 51 according to a disposition condition inside the ship body 100, and thus a sea water line L4 connecting the seawater heat exchanger 41 and the seawater pump 51 is considerably long. The seawater line L4 needs to corrosion resistance compared to the heat source circulation line L3, and needs to supply the large amount of seawater to the seawater heat exchanger 41, so that there is a problem in that the relatively large amount of cost is required.

Further, as described above, the disposition position of the configuration in the ship body 100 is inevitably limited, so that there is a problem in that space utility within the ship body 100 is seriously damaged.

In order to solve the foregoing problems, the present invention is developed, and will be described in detail below.

Non-described reference numerals L1, L2, 61, 102, 103, 105, H1, H2, E, S, P, ER, and D are a liquefied gas supply line L1, a re-vaporization line L2, a second demander 61, a center portion 102, a stern 103, a ship bottom 105, a seawater inlet H1, a seawater outlet H2, an engine E, a propeller shaft S, a propeller P, an engine room ER, and a deck D, respectively, which will be described in an exemplary embodiment of the present invention described with reference to FIGS. 2 to 4 below.

Figure 2:
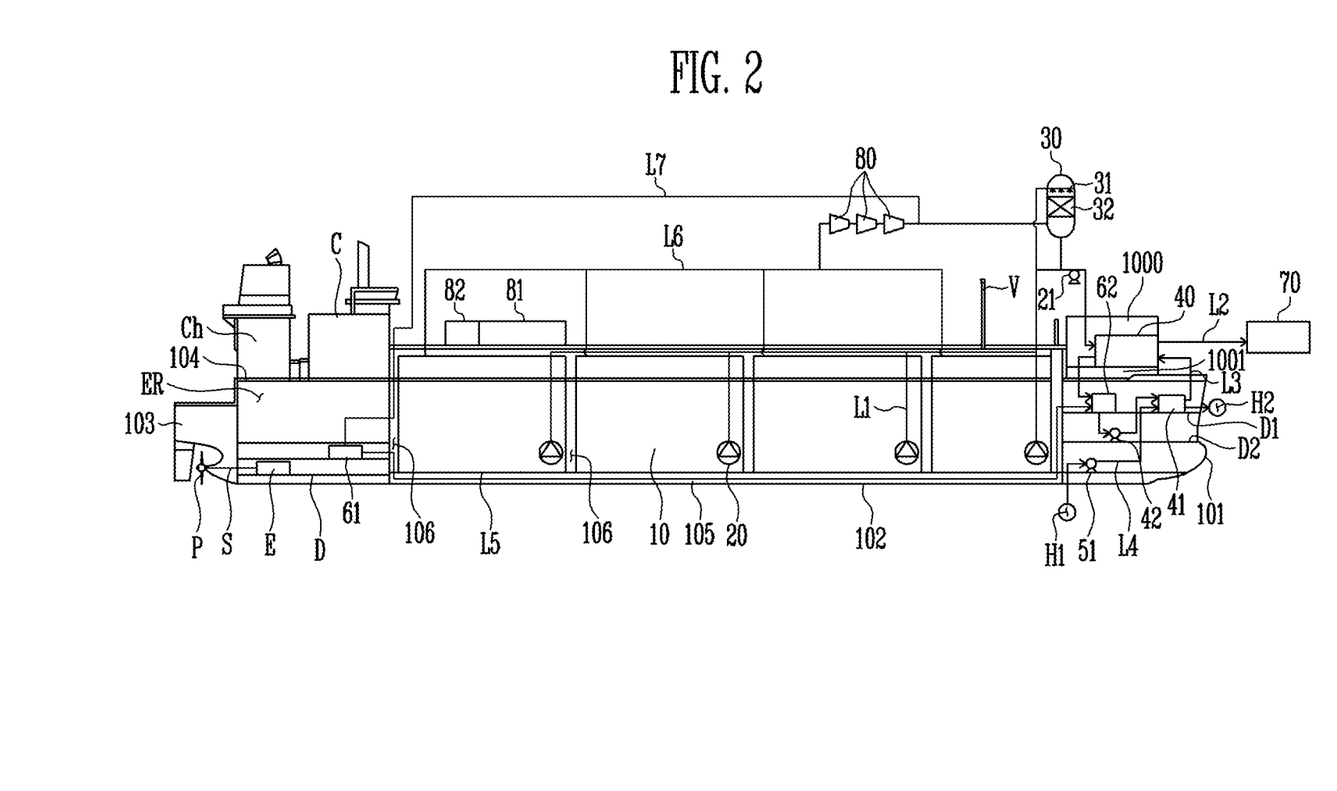
FIG. 2 is a conceptual diagram of a ship including a gas re-vaporizing system according to an exemplary embodiment of the present invention.

FIG. 2 is a conceptual diagram of a ship including a gas re-vaporizing system according to an exemplary embodiment of the present invention.

As illustrated in FIG. 2, a gas re-vaporizing system 2 according to an exemplary embodiment of the present invention includes a liquefied gas storage tank 10, a feeding pump 20, a boosting pump 21, a buffer tank 30, a vaporizer 40, a second demander 61, a first demander 70, and an BOG compressor 80.

The liquefied gas storage tank 10, the feeding pump 20, the boosting pump 21, the buffer tank 30, the vaporizer 40, the second demander 61, and the first demander 70 use the same reference numerals of the configurations in the gas re-vaporizing system 1 in the related art for convenience, but the reference numerals do not always denote the same configuration.

Herein, a ship, in which the gas re-vaporizing system 2 is installed, includes a ship body 100 formed of a stem 101, a center portion 102, a stern 103, an upper deck 104, and a ship bottom 105, and is operated and propelled by transferring power generated by an engine E of an engine room ER disposed in the stern 103 to a propeller P by a propeller shaft S.

Further, in order to re-vaporize liquefied gas on the sea and supply the liquefied gas to a land terminal, the ship may be an LNG Re-vaporization Vessel (LNG RV) or a Floating Storage and Re-vaporization Unit (FSRU), in which the gas re-vaporization system 2 is installed in a liquefied gas carrying vessel (not illustrated).

Hereinafter, the gas re-vaporizing system 2 according to the exemplary embodiment of the present invention will be described with reference to FIG. 2.

Prior to describing an individual configuration of the gas re-vaporizing system 2 according to the exemplary embodiment of the present invention, basic flow paths organically connecting the individual configurations will be described. Herein, a flow path is a passage, through which a fluid flows, and may mean a line, but is not limited thereto, and any configuration, in which a fluid flows, is acceptable.

In the exemplary embodiment of the present invention, the gas re-vaporizing system 2 may further include a liquefied gas supply line L1, a re-vaporization line L2, a heat source circulation line L3, a seawater line L4, a stem line L5, an BOG supply line L6, and an BOG branch line L7. A value (not illustrated), of which an opening level is adjustable, may be installed in each line, and the amount of BOG or liquefied gas supplied may be controlled according to the adjustment of the opening level of each valve.

The liquefied gas supply line L1 connects the liquefied gas storage tank 10 and the buffer tank 30 and is provided with the feeding pump 20, thereby supplying the liquefied gas stored in the liquefied gas storage tank 10 to the buffer tank 300 through the feeding pump 20. In this case, the liquefied gas supply line L1 may be connected with the buffer tank 30, and may be branched from an upstream of the buffer tank 30 and be directly connected to the re-vaporization line L2.

The re-vaporization line L2 connects the buffer tank 30 and the first demander 70, and is provided with the boosting pump 21 and the vaporizer 40, so that it is possible to pressurize liquefied gas temporarily stored in the buffer tank 30 or liquefied gas directly supplied from the liquefied gas supply line L1 with the boosting pump 21 and re-vaporize the pressurized liquefied gas with the vaporizer 40 to supply the re-vaporized gas to the first demander 70.

The heat source circulation line L3 circularly connects the vaporizer 40, the seawater heat exchanger 41, and the heat source pump 42, thereby allowing a first heating medium to circulate to each of the configurations. Herein, the heat source circulation line L3 may be formed to have a smaller diameter than that of the seawater line L4.

Further, in the heat source circulation line L3, heat source supply lines L3 connected to the vaporizer 40 (illustrated in FIGS. 6 and 7) constructed with four skids, the seawater heat exchanger 41, and the heat source pump 42, respectively, may be constructed by one common line. In this case, in the vaporizer 40, first to fourth vaporizer skids 401 to 404 (illustrated in FIGS. 6 and 7) are arranged in first to fourth trains 401a to 401d (illustrated in FIGS. 6 and 7), and heat source supply lines L3a to L3d (illustrated in FIGS. 6 and 7) branched from the heat source supply line L3 may be connected to the first to fourth skids 401 to 404 (illustrated in FIGS. 6 and 7), respectively.

In this case, only two heat source supply lines L3 are formed when the heat source supply line L3 formed by the common line passes through the upper deck 104, so that there is an effect in that durability of the upper deck 104 of the stem 101, and a probability of leakage of a heat source is decreased, so that there is an effect in that reliability of the system is improved. Further, in the heat source supply line L3, an additional line may be constructed in parallel, and thus, it is possible to sufficiently secure a flow amount of glycol water acceptable by one heat source supply line L3. In this case, the number of lines passing through the upper deck 104 of the stem 101 may be four.

The seawater line L4 connects the seawater inlet H1 and the seawater outlet H2 and is provided with a seawater pump 51 and the seawater heat exchanger 41, thereby supplying sea water to the seawater heat exchanger 41 through the seawater pump 51. Herein, the seawater line L4 may be formed to have a larger diameter than that of the heat source circulation line L3, and may be formed by applying a material having corrosion resistance to an inner portion thereof.

The stem line L5 connects the second demander 61 and a steam heat exchanger 62, thereby supplying steam generated by the second demander 61 to the steam heat exchanger 62.

The BOG supply line L6 connects the liquefied gas storage tank 10 and the buffer tank 30, and is provided with the BOG compressor 80, thereby pressurizing BOG generated by the liquefied gas storage tank 10 with the BOG compressor 80 and supplying the pressurized BOG to the buffer tank 30. In this case, the BOG supply line L6 may be connected to a lower side of the buffer tank 30.

The BOG branch line L7 may be branched from a downstream of the BOG compressor 80 in the BOG supply line L6 and be connected to the second demander 61, and may supply the BOG pressurized by the BOG compressor 60 to the second demander 61.

Hereinafter, the individual configurations, which are organically formed by the lines L1 to L7 and construct the gas re-vaporizing system 2, will be described.

The liquefied gas storage tank 10 stores liquefied gas to be supplied to the first demander 70. The liquefied gas storage tank 10 needs to store liquefied gas in a liquid state, and in this case, the liquefied gas storage tank 10 may have the form of a pressure tank.

Herein, the liquefied gas storage tank 10 may be disposed inside the ship body 100, and for example, four liquefied storage tank 10 may be formed in a front portion of the engine room ER. Further, the liquefied gas storage tank 10 may be, for example, a membrane-type tank, but is not limited thereto, and may have various forms, such as an independent tank, and the kind of liquefied gas storage tank 10 is not particularly limited.

A cofferdam 106 may be disposed between the liquefied gas storage tanks 10, and the cofferdam 106 may also be disposed between the engine room ER and the liquefied gas storage tank 10.

The feeding pump 20 may be provided on the liquefied gas supply line L1, and may be installed inside or outside the liquefied gas storage tank 10 and supply the liquefied gas stored in the liquefied gas storage tank 10 to the buffer tank 30.

Particularly, the feeding pump 20 is provided between the liquefied gas storage tank 10 and the buffer tank 30 on the liquefied gas supply line L1 to first pressurize the liquefied gas stored in the liquefied gas storage tank 10 and supply the pressurized liquefied gas to the buffer tank 30.

The feeding pump 20 may pressurize the liquefied gas stored in the liquefied gas storage tank 10 at 6 to 8 bars and supply the pressurized liquefied gas to the buffer tank 30. Herein, the feeding pump 20 may pressurize the liquefied gas discharged from the liquefied gas storage tank 10, so that a pressure and a temperature of the pressurized liquefied gas may be slightly increased, and the pressurized liquefied gas may be still in a liquid state.

In this case, when the feeding pump 20 is provided inside the liquefied gas storage tank 10, the feeding pump 20 may be a submersible pump, and when the feeding pump 20 is provided outside the liquefied gas storage tank 10, the feeding pump 20 may be provided at a position inside the ship body 100 lower than a water level of the liquefied gas stored in the liquefied gas storage tank 10 and may be a centrifugal pump.

The boosting pump 21 may be provided between the buffer tank 30 and the vaporizer 40 on the liquefied gas supply line L1, and may pressurize the liquefied gas supplied from the feeding pump 20 or the liquefied gas supplied from the buffer tank 30 at 50 to 120 bars and supply the pressurized liquefied gas to the vaporizer 40.

The boosting pump 21 may pressurize the liquefied gas in accordance with a pressure demanded by the first demander 70, and may be formed of a centrifugal pump. Herein, the boosting pump 21 may be provided at an upper side of the upper deck 104 of the stem 101.

The buffer tank 30 may be connected with the liquefied gas supply line L1, and may receive the liquefied gas from the liquefied gas storage tank 10 and temporarily store the received liquefied gas.

Particularly, the buffer tank 30 may receive the liquefied gas stored in the liquefied gas storage tank 10 from the feeding pump 20 through the liquefied gas supply line L1, and may temporarily store the received liquefied gas to separate the liquefied gas into a liquid phase and a gas phase, and the separated liquid phase may be supplied to the boosting pump 21.

That is, the buffer tank 30 temporarily stores the liquefied gas and separates the liquefied gas into a liquid phase and a gas phase and then supplies the complete liquid phase to the boosting pump 21 to enable the boosting pump 21 to satisfy a Net Positive Suction Head (NPSH), thereby preventing cavitation of the boosting pump 21.

Further, the buffer tank 30 may be connected with the BOG supply line L6, and may receive the BOG generated in the liquefied gas storage tank 10 and temporarily store the received BOG.

Particularly, the buffer tank 30 may receive the BOG generated in the liquefied gas storage tank 10 from the BOG compressor 80 through the BOG supply line L6 and temporarily store the received BOG.

Accordingly, the buffer tank 30 may heat exchange the liquefied gas, which is received from the liquefied gas supply line L1 and is temporarily stored, and the BOG, which is received from the BOG supply line L6 and is temporarily stored, and re-condense the liquefied gas and the BOG. Herein, the buffer tank 30 may be formed in a pressure container type, which is capable of withstanding pressure, and may withstand 6 to 8 bars or 6 to 15 bars.

Accordingly, the buffer tank 30 receives the BOG and the liquefied gas at about 6 to 8 bars (or 6 to 15 bars) through the BOG compressor 80 and the feeding pump 20, so that re-condensation efficiency is improved compared to low-pressure BOG or liquefied gas, and the buffer tank 30 re-condenses the BOG and the liquefied gas in the pressure maintained states and supplies the re-condensed BOG and liquefied gas to the boosting pump 21, so that there is an effect in that a compression load of the boosting pump 21 is decreased.

In this case, the buffer tank 30 is provided with a spray part 31 and a packing part 32, thereby effectively re-condensing the temporarily stored liquefied gas and BOG.

The spray part 31 may be extended from a distal end of the liquefied gas supply line L1 to an internal side of the buffer tank 30 and be arranged at an upper side of the packing part 32, and may spray the liquefied gas supplied through the liquefied gas supply line L1 to the packing part 32.

The spray part 31 may spray the liquefied gas in the liquid phase and increase an area, in which the liquefied gas is in contact with the BOG, and may perform a similar role to that of the packing part 32.

The packing part 32 may be provided at a center of the internal side of the buffer tank 30, and may be formed of a member, such as gravel, therein so as to increase an area, in which the liquefied gas supplied through the liquefied gas supply line L1 is in contact with the BOG supplied through the BOG supply line L1. That is, in the packing part 32, many pores are formed through the gravel formed inside the packing part 32, and an area, in which the liquefied gas is in contact with the BOG while flowing, may be increased through the pores.

Accordingly, the packing part 32 may increase exchange of the heat exchange of the liquefied gas and the BOG and improve a re-condensation rate.

Herein, the buffer tank 30 is connected with the liquefied gas supply line L1 at an upper position than that of the packing part 32 and is connected with the BOG supply line L6 at a lower position than that of the packing part 32, thereby maximally using flow properties of the liquid phase and the gas phase. Further, the buffer tank 30 may be provided at the upper side of the upper deck 104 of the stem 101.

The vaporizer 40 may be provided on the re-vaporization line L2 and re-vaporize the high-pressure liquefied gas discharged from the boosting pump 21.

Particularly, the vaporizer 40 may be provided on the re-vaporization line L2 between the first demander 70 and the boosting pump 21, and may vaporize the high-pressure liquefied gas supplied from the boosting pump 21 and supply the vaporized liquefied gas in a state desired by the first demander 70.

The vaporizer 40 receives the first heating medium through the heat source circulation line L3, heat exchanges the received first heat medium and the liquefied gas, and vaporizes the liquefied gas, and circulates the first heat medium, which is heat exchanged with the liquefied gas, through the heat source circulation line L3 again.

The vaporizer 40 may include the seawater heat exchanger 41 and the steam heat exchanger 61 on the heat source circulation line L3 in order to continuously supply a heat source to the first heat medium, and may additionally include the heat source pump 42 and circulate the first heat medium to the heat source circulation line L3.

In this case, the vaporizer 40 may use a nonexplosive heat medium, such as glycol water, sea water, steam, or engine exhaust gas, as the first heat medium for vaporizing the liquefied gas, and may supply the high-pressure vaporized liquefied gas to the first demander 70 without a change in pressure.

Herein, the vaporizer 40 may be disposed at the upper side of the upper deck 104 of the stem 101, and the seawater heat exchanger 41, the steam heat exchanger 61, and the heat source pump 42 may be modulated and disposed in an internal space of the stem 101.

For example, the seawater heat exchanger 41, the steam heat exchanger 61, and the heat source pump 42 may also be modulated and disposed at an internal side of the ship body 100, preferably, an inner portion of the engine room ER, but preferably, may be disposed in the inner space of the stem 101.

Accordingly, the present invention will be described based on an example, in which the seawater heat exchanger 41, the steam heat exchanger 61, and the heat source pump 42 are disposed in the internal space of the stem 101, and an example, in which the seawater heat exchanger 41, the steam heat exchanger 61, and the heat source pump 42 are disposed at one side or both sides of the engine room ER will be described with reference to FIGS. 5 to 9.

The seawater heat exchanger 41, the steam heat exchanger 61, and the heat source pump 42 may be vertically divided by at least one deck that vertically divides the internal space of the ship body 100. For example, in the exemplary embodiment of the present invention, the internal space of the stem 101 is vertically divided by a first deck D1 and a second deck D2, but the present invention is not limited thereto.

The seawater heat exchanger 41 may be provided on the seawater line L4 and the heat source circulation line L3, and serve to heat exchange the seawater received through the seawater line L4 and the first heat medium received through the heat source circulation line L3 and transfer the heat source of the seawater to the first heat medium.

The seawater heat exchanger 41 may be arranged on the first deck D1 in the internal space of the stem 101, and may be disposed at a position adjacent to the seawater outlet H2.

As illustrated in FIG. 1, in the gas re-vaporizing system 1 in the related art, the sea water heat exchanger 41 and the heat source pump 42 are disposed at the upper side of the upper deck 104 of the ship body 100, so that the seawater line L4 connecting the seawater pump 51 and the seawater heat exchanger 41 is very long. The seawater line L4 needs to have corrosion resistance and use a pipe having a large diameter, so that the seawater line L4 is very expensive, and as described above, the seawater line L4 in the related art is very long, so that there is a problem in that construction cost of the system is huge.

In this respect, in the exemplary embodiment of the present invention, the seawater heat exchanger 41 and the heat source pump 42 are modulated together and disposed on the first deck D1 in the internal space of the stem 101, and particularly, are disposed at the position adjacent to the seawater outlet H2, thereby innovatively decreasing the seawater line L4 and thus achieving an effect in that construction cost is minimized.

As described above, in the exemplary embodiment of the present invention, the nonexplosive heat medium is used as the first heat medium, so that the configurations (heat source supply apparatus) using the first heat medium may be disposed inside the ship body 100, and further, the configurations (heat source supply apparatus) using the first heat medium may be modulated and become compact, so that the configurations (heat source supply apparatus) using the first heat medium may be implemented so as to be disposed inside the ship body 100.

Further, in the exemplary embodiment of the present invention, the gas re-vaporizing system 2 may further include the seawater pump 51 provided on the seawater line L4.

The seawater pump 51 may supply seawater to the seawater heat exchanger 41 through the seawater line L4, and may be disposed on the ship bottom 105 (preferably, a position adjacent to the seawater inlet H1) in the internal space of the stem 101.

As illustrated in FIG. 1, in the gas re-vaporizing system 1 in the related art, the seawater pump 51 is disposed in the engine room ER, so that the seawater line L4 connecting the seawater pump 51 and the seawater heat exchanger 41 is very long. Accordingly, in the related art, the seawater line L4 is very long, so that there is a problem in that construction cost is huge.

In this respect, the seawater pump 51 is disposed on the ship bottom 105 in the internal space of the stem 101, and particularly, is disposed at the position adjacent to the seawater inlet H1, thereby innovatively decreasing the seawater line L4 and thus achieving an effect in that construction cost is minimized.

The steam heat exchanger 61 may be provided on the steam line L5 and the heat source circulation line L3, and may serve to heat exchange the steam received through the steam line L5 and the first heat medium received through the heat source circulation line L3, and additionally transfer a heat source of the seawater to the first heat medium. Herein, the steam may be heat exchanged with the first heat medium next to the seawater. That is, when the heat source supplied from the seawater is insufficient, the steam may supply a heat source to the first heating medium as the second best plan in order to supplement the insufficient heat source.

The steam heat exchanger 61 may be arranged on the first deck D1 in the internal space of the stem 101.

The heat source pump 42 may be arranged on the heat source circulation line L3 to make the first heat medium circulate the seawater heat exchanger 41 and the steam heat exchanger 61 provided on the heat source circulation line L3.

The heat source pump 42 may be modulated with the seawater heat exchanger 41 and be arranged in the internal space of the stem 101, and further, may be disposed on the second deck D2 in the internal space of the stem 101 and be vertically divided from the seawater heat exchanger 41 with the first deck D1 interposed therebetween.

As described above, in the exemplary embodiment of the present invention, the nonexplosive heat medium is used as the first heat medium, and the configurations (heat source supply apparatus) using the first heat medium are modulated, so that the configurations (heat source supply apparatus) may be implemented so as to be disposed inside the ship body 100. In addition, in the exemplary embodiment of the present invention, in order to decrease a circulation flow amount of the first heat medium for enabling the configurations (heat source supply apparatus) using the first heat medium to be disposed inside the ship body 100, the gas re-vaporizing system has a systematic disposition and the configuration of the lines illustrated in FIG. 4.

Hereinafter, the disposition and the configurations of the gas re-vaporizing system will be described in detail with reference to FIG. 4.

Figure 4:
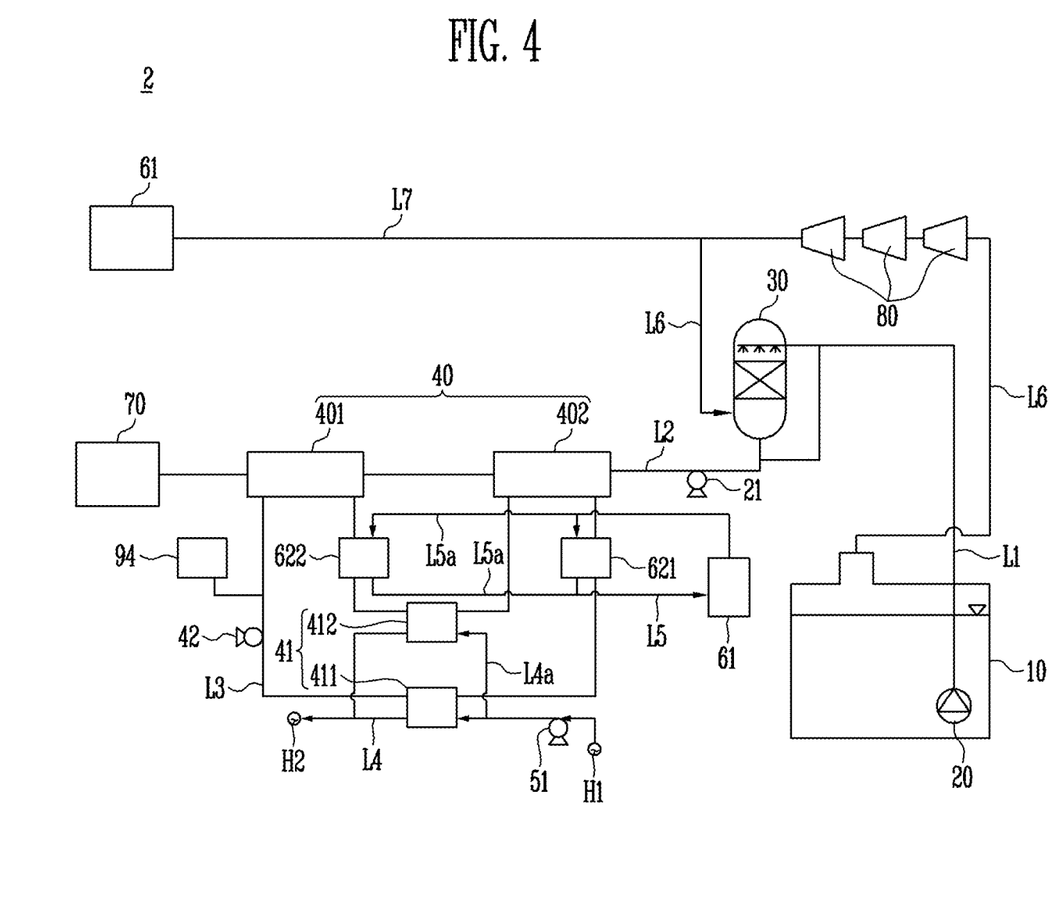
FIG. 4 is a conceptual diagram of a gas re-vaporizing system according to an exemplary embodiment of the present invention.

FIG. 4 is a conceptual diagram of the gas re-vaporizing system according to the exemplary embodiment of the present invention.

Herein, the vaporizer 40 may be formed of a first heat exchanger 401 and a second heat exchanger 402 on the re-vaporization line L1, the seawater heat exchanger 41 may be formed of a first seawater heat exchanger 411 and a second seawater heat exchanger 412 on the heat source circulation line L3, and the steam heat exchanger 62 may be formed of a first heater 621 and a second heater 622 on the heat source circulation line L3.

In this case, the first heat exchanger 401 may serve to increase a temperature of the liquefied gas vaporized with a trim heater, and the second heat exchanger 402 may serve to vaporize the liquefied gas in the liquid phase to the liquefied gas in the gas phase with an LNG vaporizer. Further, the first heater 621 and the second heater 622 may be electric heaters.

Further, in the exemplary embodiment of the present invention, the gas re-vaporizing system may further include a seawater parallel line L4a and a steam parallel line L5a, and the seawater parallel line L4a may be branched on the seawater line L4 and be connected with the second seawater heat exchanger 412 in parallel, and the steam parallel line L5a may be branched on the steam line L5 and be connected with the second heater 622 in parallel.

The configuration of the vaporizer 40 of the gas re-vaporizing system 2 according to the exemplary embodiment of the present invention will be described with reference to FIG. 4. The first heat exchanger 401, the first seawater heat exchanger 411, the second heat exchanger 402, and the second seawater heat exchanger 412 may be sequentially arranged on the heat source circulation line L3. Herein, the first heater 621 is provided between the first seawater heat exchanger 411 and the second heat exchanger 402 on the heat source circulation line L3, and the second heater 622 is provided between the second seawater heat exchanger 412 and the first heat exchanger 401 on the heat source circulation line L3. Herein, the seawater may heat the first heat source over steam.

In the exemplary embodiment of the present invention, it is possible to remarkably decrease a flow amount of the first heat medium and maintain a vaporization rate of the liquefied gas by the sequential disposition of the configurations, so that there is an effect in that it makes it actually possible to dispose the configurations (heat source supply apparatus) using the first heat medium inside the ship body 100.

Further, the gas re-vaporizing system 2 according to the exemplary embodiment of the present invention may further include a pressure maintaining device 94.

The pressure maintaining device 94 may maintain a pressure of the first heat medium flowing in the heat source circulation line L3 by using inert gas.

As described above, in the exemplary embodiment of the present invention, the pressure maintaining device 94 maintains the pressure of the first heat medium by using inert gas, so that the pressure maintaining device 94 may become compact, thereby achieving an effect in that the pressure maintaining device 94 is disposed in the internal space of the ship body 100.

The second demander 61 receives the BOG generated in the liquefied gas storage tank 10 and uses the received BOG as fuel. That is, the second demander 61 may require BOG and may be driven by using the BOG as fuel. The second demander 61 may be a generator (for example, a Dual Fuel Diesel Generator (DFDG), a Gas Combustion Unit (GCU), and a boiler (for example, a boiler generating steam)), but is not limited thereto.

Particularly, the second demander 61 is connected with an BOG branch line L7 branched from a downstream of the BOG compressor 80 on the BOG supply line L6, and may receive the BOG pressurized at a low pressure of about 1 to 6 bars (a maximum of 15 bars) by the BOG compressor 80 and use the received BOG as fuel.

Further, the second demander 61 may be a heterogeneous fuel engine usable heterogeneous fuel, so that the second demander 61 may use oil as fuel, as well as the BOG, but it is not that the BOG and the oil are mixed and supplied, but the BOG and the oil may be selectively supplied. This is for the purpose of preventing efficiency of the second demander 61 from being degraded by blocking two materials having different combustion temperatures from being mixed and supplied.

Herein, the second demander 61 may be arranged inside the stern 103 and be provided on the deck D of the engine room ER, and the second demander 61 may be connected with the steam heat exchanger 62 through the steam line L5.

In this case, the steam line L5 may connect the second demander 61 located in the stern 103 and the steam heat exchanger 62 located in the stem 101 through an internal space of a hull, which is arranged in the ship bottom 105 and has a form of dual partition walls.

The first demander 70 may receive and consume the liquefied gas vaporized by the vaporizer 40. Herein, the first demander 70 may receive and use the liquefied gas in the gas phase obtained by vaporizing the liquefied gas, and may be a land terminal installed on land or a sea terminal floated and installed on the sea.

The BOG compressor 80 may pressurize the BOG generated by the liquefied gas storage tank 10 and supply the pressurized BOG to the buffer tank 30 or the second demander 61. Herein, the BOG compressor 80 may be disposed inside a compressor room 81, and a motor room 82 may be disposed in a lateral portion of the compressor room 81.

Particularly, the BOG compressor 80 may be provided on the BOG supply line L6 and may pressurize the BOG generated by the liquefied gas storage tank 10 at about 6 to 8 bars or 6 to 15 bars and supply the pressurized BOG to the buffer tank 30 or the second demander 61. In this case, the second demander 61 may receive the BOG through the BOG branch line L7 branched from the BOG supply line L6.

There are provided the plurality of BOG compressors 80 to pressurize the BOG in multiple stages, and for example, there are provided three BOG compressors 80 to pressurize the BOG in three stages. Herein, the three stage compressors are simply one example, and the BOG compressor 80 is not limited to the three stages.

In the exemplary embodiment of the present invention, an BOG cooler (not illustrated) may be provided at a rear end of each of the BOG compressors 80. When the BOG is pressurized by the BOG compressor 80, a temperature of the BOG may also increase according to an increase in pressure, so that in the exemplary embodiment of the present invention, the temperature of the BOG may be lowered again by using the BOG cooler. There may be installed the same number of BOG coolers as that of the BOG compressors 80, and each BOG cooler may be arranged in the downstream of each BOG compressor 80.

Further, in the exemplary embodiment of the present invention, when the BOG compressors 80 are provided in parallel and the amount of BOG generated in the liquefied gas storage tank 10 is sharply increased, the BOG compressors 80 may accommodate all of the BOG, or when one of the BOG compressors 80 is erroneously operated or is shut down, the one remaining BOG compressor 80 may be operated, so that it is possible to efficiently accommodate and process the BOG generated in the liquefied gas storage tank 10. Herein, the BOG compressor 80 may be provided at the upper side of the upper deck 104 of the stem 101.

As described above, the ship including the gas re-vaporizing system according to the present invention has an effect in that efficiency of the re-vaporization of the liquefied gas is maximized.

Figure 3:
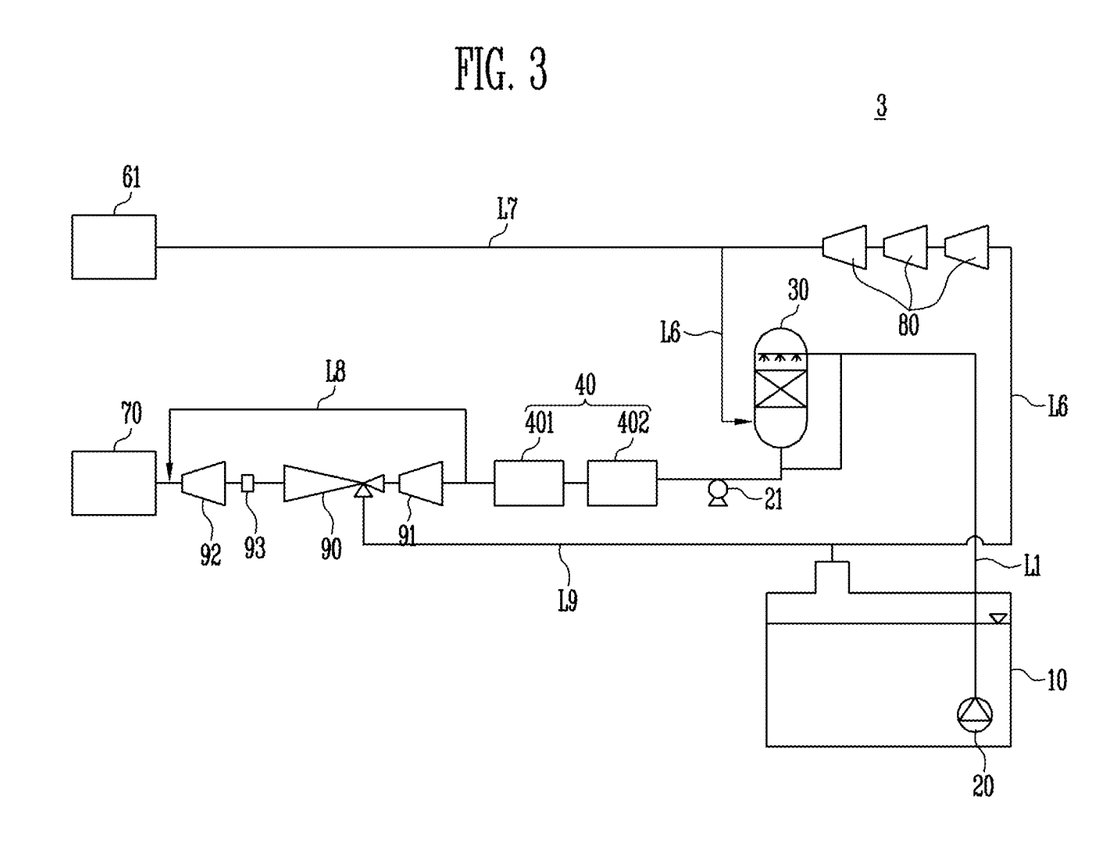
FIG. 3 is a conceptual diagram of a gas re-vaporizing system according to another exemplary embodiment of the present invention.

FIG. 3 is a conceptual diagram of a gas re-vaporizing system according to another exemplary embodiment of the present invention.

As illustrated in FIG. 3, a gas re-vaporizing system according to another exemplary embodiment of the present invention includes a liquefied gas storage tank 10, a feeding pump 20, a boosting pump 21, a buffer tank 30, a vaporizer 40, a second demander 61, a first demander 70, an BOG compressor 80, an BOG sucking unit 90, first and second pressurizing means 91 and 92, and a nitrogen separator 93.

Hereinafter, the gas re-vaporizing system 3 according to the exemplary embodiment of the present invention will be described with reference to FIG. 3.

The liquefied gas storage tank 10, the feeding pump 20, the boosting pump 21, the buffer tank 30, the vaporizer 40, a first heat exchanger 41, a second heat exchanger 42, the second demander 61, the first demander 70, and the BOG compressor 80 are the same as or similar to those of the gas re-vaporizing system 2 according to the exemplary embodiment of the present invention, thereby being substitution for the gas re-vaporizing system 2 according to the exemplary embodiment of the present invention.

In the exemplary embodiment of the present invention, the gas re-vaporizing system 3 may further include a bypass line L8 and an BOG sucking line L9. A value (not illustrated), of which an opening level is adjustable, may be installed in each line, and the amount of BOG or liquefied gas supplied may be controlled according to the adjustment of the opening level of each valve.

The bypass line L8 may be branched from a downstream of the vaporizer 40 on a re-vaporization line L2, preferably, a downstream of the first heat exchanger 401, and may be connected to an upstream of the first demander 70 after bypassing the BOG sucking unit 90.

The bypass line L8 may directly supply liquefied gas re-vaporized by the vaporizer 40 to the first demander 70 when the BOG sucking unit 90 is not driven.

The BOG sucking line L9 may connect the BOG sucking unit 90 and the liquefied gas storage tank 10 and supply the BOG generated in the liquefied gas storage tank 10 to the BOG sucking unit 90.

The BOG sucking unit 90 is arranged in the downstream of the vaporizer 40 on the re-vaporization line L2 and sucks the BOG generated in the liquefied gas storage tank 10.

Particularly, the BOG sucking unit 90 may be arranged in the downstream of the vaporizer 40 on the re-vaporization line L2 and be connected to the liquefied gas storage tank 10 through the BOG sucking line L9, and suck the BOG generated in the liquefied gas storage tank 10 through the BOG sucking line L9 by using the vaporized liquefied gas supplied from the vaporizer 40 through the re-vaporization line L2 as a driving fluid and mix the liquefied gas and the BOG, and supply the mixed liquefied gas and BOG to the first demander 70 again through the re-vaporization line L2.

In this case, the BOG sucking unit 90 may receive the vaporized liquefied gas having a pressure of 50 to 120 bars, suck the BOG of the liquefied gas storage tank 10 having a pressure of 1 to 1.1 bar, and mix the liquefied gas and the BOG, and the BOG sucking unit 90 may be an ejector, an educator, or a jet pump.

The vaporized liquefied gas flowing into the BOG sucking unit 90 has a pressure of 50 to 120 bars (preferably, 100 bars), and the BOG generated in the liquefied gas storage tank 10 has a pressure of 1.00 bar to 1.10 bar (preferably, about 1.06 bar).

The BOG sucking unit 90 may receive the liquefied gas re-vaporized by the vaporizer 40 by using the driving fluid, suck the BOG generated in the liquefied gas storage tank 10, and mix the liquefied gas and the BOG, and in this case, kinetic energy of the driving fluid is converted into kinetic energy of the entire mixed fluid, and subsequently, a speed of the mixed fluid is decreased in a distal end portion, in which a cross section of a nozzle (not illustrated) of the BOG sucking unit 90 is enlarged, so that kinetic energy of the mixed fluid is converted into pressure again.

Accordingly, the BOG generated in the liquefied gas storage tank 10 obtains the mixed fluid having a pressure lower than a pressure of 50 to 120 bars that is an inflow pressure of the driving fluid. Accordingly, the first demander 70 cannot consume the liquefied gas at the corresponding pressure, so that the liquefied gas needs to be additionally compressed by a separate pressurizing means and then be supplied to the first demander 70, and herein, the separate pressurizing means is a second pressurizing means 92 which is to be described below.

Herein, a pressure of the driving fluid is high, so that it is possible to easily increase the pressure of the sucked fluid even with the small amount of fluids.

As described above, the gas re-vaporizing system 3 according to the exemplary embodiment of the present invention processes the BOG generated in the liquefied gas storage tank 10 through the BOG sucking unit 90, so that it is not necessary to construct a separate re-condenser, which re-condenses the BOG, thereby decreasing construction cost, and the system becomes compact, thereby improving reliability.

The first pressurizing means 91 is provided between the BOG sucking unit 90 and the vaporizer 40 on the re-vaporizing line L2 to pressurize the vaporized liquefied gas discharged from the vaporizer 40. In this case, the first pressurizing means 91 is a means pressurizing gas, and may be, for example, a compressor.

Particularly, the first pressurizing means 91 may be disposed between the BOG sucking unit 90 and a branched point of the bypass line L8, and pressurize the liquefied gas vaporized by the vaporizer 40 at 120 bars or more and supply the pressurized liquefied gas to the BOG sucking unit 90.

That is, the first pressurizing means 91 may compensate for the pressure lost in the vaporizer 40 and supply the liquefied gas to the BOG sucking unit 90, and may further increase the pressure of the vaporized liquefied gas according to the amount of sucked BOG generated in the liquefied gas storage tank 10, so that there is an effect in that it is possible to efficiently process the BOG.

The second pressurizing means 92 may be provided between the BOG sucking unit 90 on the re-vaporization line L2 and the first demander 70, thereby pressurizing the mixed fluid (the mixture of the vaporized liquefied gas and the BOG) discharged from the BOG sucking unit 90. In this case, the second pressurizing means 92 is a means pressurizing gas, and may be, for example, a compressor.

Particularly, the second pressurizing means 92 may be disposed between the nitrogen separator 93 and a connection point of the bypass line L8, and may pressurize the mixed fluid discharged from the BOG sucking unit 90 at 50 to 120 bars and supply the pressurized mixed fluid to the first demander 70.

That is, the second pressurizing means 92 may compensate for the pressure lost by the BOG sucking unit 90 and supply the liquefied gas to the first demander 70, so that there is an effect in that it is possible to appropriately satisfy the pressure required by the first demander 70.

The nitrogen separator 93 may be provided between the BOG sucking unit 90 on the re-vaporization line L2 and the second pressurizing means 92, and may separate and remove a nitrogen component within the mixed fluid (the mixture of the vaporized liquefied gas and the BOG) discharged from the BOG sucking unit 90.

The separated nitrogen may be supplied to a nitrogen demander (not illustrated) consuming nitrogen within the ship body 100, and for example, the separated nitrogen may be supplied to the pressure maintaining device 94 and be used for maintaining the pressure of the first heat medium.

In the exemplary embodiments described with reference to FIGS. 2 to 4, a cargo switchboard room (cargo SWBD room) 1001 may be disposed at a lower side of the re-vaporization unit room 1000, a vent mast V may be disposed on the upper deck 104, and a cabin C and a chimney Ch may be disposed on the upper deck 104 at the upper side of the engine room ER.

Figure 5:
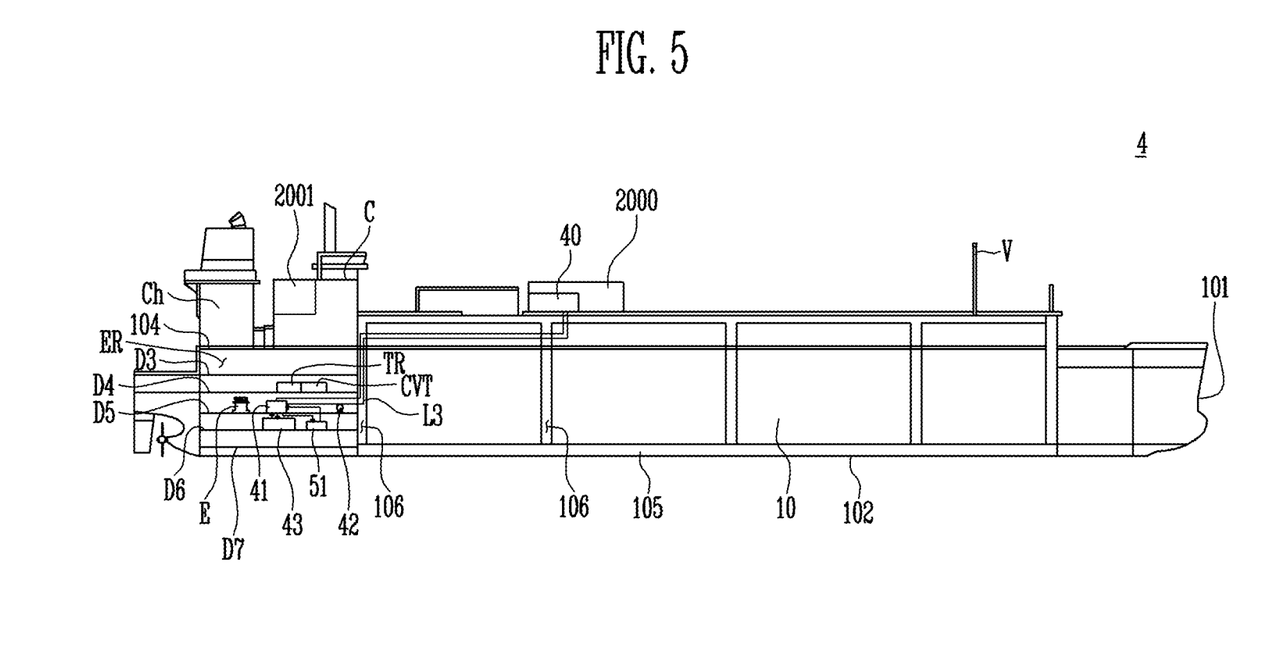
FIG. 5 is a conceptual diagram of a ship including a gas re-vaporizing system according to another exemplary embodiment of the present invention.
Figure 6:
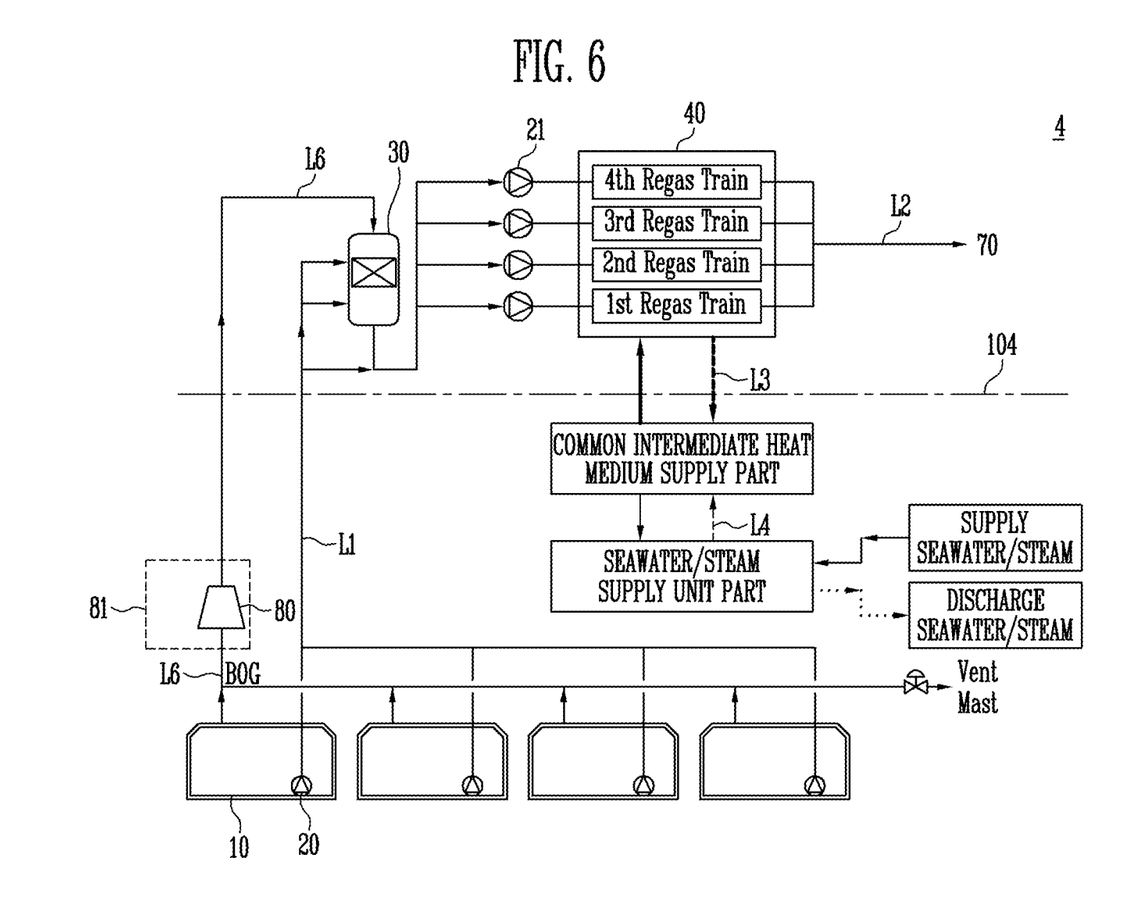
FIG. 6 is a conceptual diagram illustrating a gas re-vaporizing system according to another exemplary embodiment of the present invention.
Figure 7:
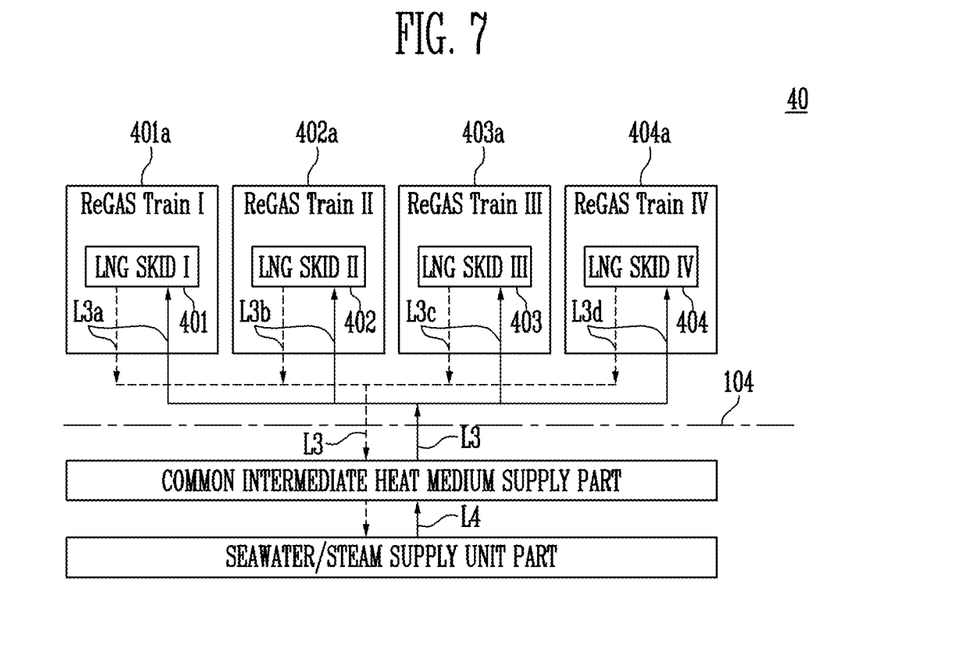
FIG. 7 is a conceptual diagram illustrating a gas re-vaporizing system according to another exemplary embodiment of the present invention in detail.
Figure 8:
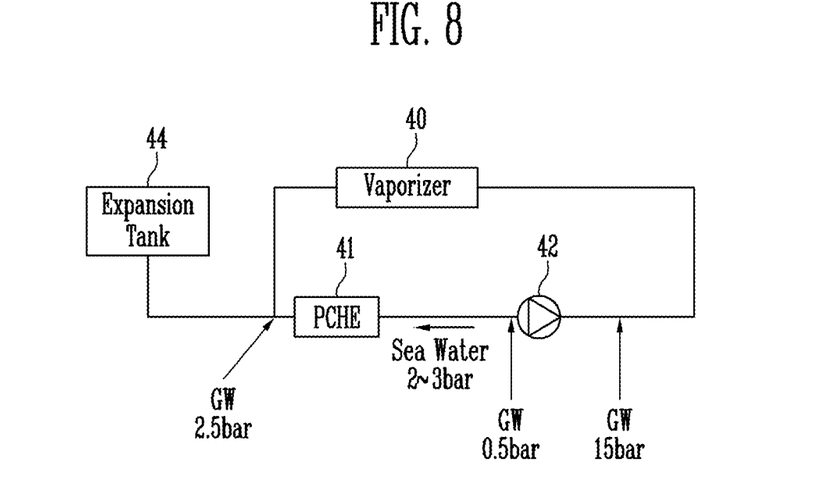
FIG. 8 is a conceptual diagram illustrating a glycol water circulating apparatus according to an exemplary embodiment of the present invention.

FIG. 5 is a conceptual diagram of a ship including a gas re-vaporizing system according to another exemplary embodiment of the present invention, FIG. 6 is a conceptual diagram illustrating a gas re-vaporizing system according to another exemplary embodiment of the present invention, FIG. 7 is a conceptual diagram illustrating a gas re-vaporizing system according to another exemplary embodiment of the present invention in detail, and FIG. 8 is a conceptual diagram illustrating a glycol water circulating apparatus according to an exemplary embodiment of the present invention.

As illustrated in FIGS. 5 to 8, a gas re-vaporizing system 4 according to another exemplary embodiment of the present invention includes a liquefied gas storage tank 10, a feeding pump 20, a boosting pump 21, a buffer tank 30, a vaporizer 40, a second demander 61, a first demander 70, and an BOG compressor 80.

In the exemplary embodiment described with reference to FIGS. 2 to 4, the technology, in which the seawater heat exchanger 41, the steam heat exchanger 62, and the heat source pump 42 are modulated and disposed at a lower side of the upper deck 104 of the stem 101 in the internal side of the ship body 100, that is, the internal space of the stem 101, has been described. Hereinafter, an invention, in which a seawater heat exchanger 41, a steam heat exchanger 62, and a heat source pump 42 are disposed inside an engine room ER, will be described with reference to FIGS. 5 to 8.

Non-mentioned configurations among the configurations illustrated in FIGS. 5 to 8 are the same as those of the ship including the gas re-vaporizing systems 2 and 3 described with reference to FIGS. 2 to 4, thereby being in substitution for the descriptions with reference to FIGS. 2 to 4. However, the exemplary embodiment to be described with reference to FIGS. 5 to 8 is different in two points from the ship including the gas re-vaporizing systems 2 and 3 described with reference to FIGS. 2 and 4.

First, the re-vaporization unit room 1000, in which the boosting pump 21, the re-condenser 30, and the vaporizer 40 are accommodated, is disposed on the upper deck 104 of the stem 101 in the ship including the gas re-vaporizing systems 2 and 3 described with reference to FIGS. 2 to 4, but a re-vaporization unit room 2000, in which the boosting pump 21, the re-condenser 30, and the vaporizer 40 are accommodated, is disposed at the center of the ship body in the gas re-vaporizing system 4 illustrated in FIGS. 5 to 8 (a first difference—a difference in the disposition position of the gas re-vaporizing system), and the configurations of the intermediate heat medium supply apparatus, such as the seawater heat exchanger 41, the steam heat exchanger 61, and the heat source pump 42, are disposed at the lower side of the upper deck 104 of the stem 101, that is, inside the stem 101 in the ship including the gas re-vaporizing systems 2 and 3 described with reference to FIGS. 2 to 4, but the configurations of the intermediate heat medium supply apparatus, such as the seawater heat exchanger 41, the steam heat exchanger 61, and the heat source pump 42, are disposed inside the stern 103 (preferably, inside the engine room ER) including the ship including the gas re-vaporizing system 4 illustrated in FIGS. 5 to 8 (a second difference—a difference in the disposition position of the intermediate heat medium supply apparatus).

Hereinafter, the present invention will be mainly described in detail based on the differences with reference to FIGS. 5 to 8.

The liquefied gas storage tank 10, the feeding pump 20, the boosting pump 21, the buffer tank 30, the vaporizer 40, the first heat exchanger 41, the second heat exchanger 42, the first demander 70, and the BOG compressor 80 are the same as or similar to those of the gas re-vaporizing systems 2 and 3 according to the exemplary embodiment and other exemplary embodiments of the present invention, thereby being in substitution for those of the gas re-vaporizing systems 2 and 3 according to the exemplary embodiment and other exemplary embodiments of the present invention.

In the exemplary embodiment of the present invention, the re-vaporizing system 4 may further include a glycol water storage tank 43, an expansion tank 44, the re-vaporization unit room 2000, a cargo switchboard room 2001, a transfer room TR, and a convert room CVT.

Herein, the transfer room TR and the convert room CVT may be disposed on a third deck D4, the cargo switchboard room 2001 may be disposed inside the cabin C, and the cabin C may be formed to be lower than the cabin disposed in the ships including the gas re-vaporizing systems 2 and 3 according to the exemplary embodiments described with reference to FIGS. 2 to 4.

In the exemplary embodiment of the present invention, an existing boiler (not illustrated), which is installed inside the engine room ER, may be removed, and the intermediate heat medium supply apparatus, such as the seawater heat exchanger 41, the heat source pump 42, and the glycol water storage tank 43, may be disposed in the front portion of an engine E within the engine room ER.

According to the removal of the boiler, a space, in which the engine E is shifted in the direction of the stern, is secured in a fourth deck D5, and thus, a space, in which the intermediate heat medium supply apparatus, such as the seawater heat exchanger 41, the heat source pump 42, and the glycol water storage tank 43, are to be disposed, is secured in the front portion of the engine E. Accordingly, the intermediate heat medium supply apparatus may be disposed within the cabin according to a usage of a non-explosive heat medium, and may be disposed within the engine room ER inside the cabin, so that it is possible to secure a large space on the upper deck 104, thereby achieving an effect in that space availability of the ship is improved.

In this case, the engine E may be connected to the DFDE by a scheme of a connection by a motor (not illustrated), not a scheme of a direct connection to a propeller shaft S.

Herein, there are arranged four seawater heat exchangers 41 and all of the four seawater heat exchangers 41 may be disposed on a fourth deck D5, and the seawater pump 51 may be disposed on a floor D6. Accordingly, a difference in height between the seawater pump 51 and the seawater heat exchanger 41 is gradually decreased, a head of the seawater pump 51 is decreased, so that there is an effect in that operating expenditure is decreased.

Further, the seawater heat exchanger 41 may be disposed on a sea surface or to be lower than the sea surface when the seawater heat exchanger 41 is disposed on the fourth deck D5 inside the engine room ER. Accordingly, a discharge line of the seawater discharged from the seawater heat exchanger 41 may be formed to be short, so that there is an effect in that it is possible to prevent a vacuum phenomenon generated when the seawater is discharged to the outside.

In the exemplary embodiment of the present invention, the glycol water storage tank 43 is a tank storing glycol water for a moment for repairing the intermediate heat medium supply apparatus (preferably, the seawater heat exchanger 41), and may be disposed on the floor D6.

That is, the glycol water storage tank 43 is disposed at the lower side of the seawater heat exchanger 41, so that it is not necessary to construct a separate transfer pump for draining glycol water during the repair of the intermediate heat medium supply apparatus, thereby achieving an effect in that construction cost is decreased.

Further, in the exemplary embodiment of the present invention, when the heat source circulation line L3 passes through the upper deck 104 and is connected to the vaporizer 40, the heat source circulation line L3 may be connected to the vaporizer 40 via a coffer dam 106 formed in the front portion of the engine room ER.

Particularly, the heat source circulation line L3 may horizontally pass through the coffer dam 106 in the direction of the coffer dam 106 from the engine room ER and be inserted into the coffer dam 106, is vertically shifted within the coffer dam 106, and then pass through the upper deck 104 on the coffer dam 106 and be connected to the vaporizer 40 within the re-vaporization unit room 2000. In this case, a collecting device (not illustrated), which collects leaking glycol water at the lowermost side of the coffer dam 106.

Accordingly, it is not necessary to construct a separate ventilation system when the heat source circulation line L3 passes through the upper deck 104, so that there is an effect in that construction cost is decreased.

Further, in the exemplary embodiment of the present invention, as illustrated in FIGS. 6 and 7, the heat source supply lines L3 connected to the vaporizer 40 (illustrated in FIGS. 6 and 7) constructed with four skids, the seawater heat exchanger 41, and the heat source pump 42, respectively, may be constructed by one common line. In this case, in the vaporizer 40, first to fourth vaporizer skids 401 to 404 are arranged on first to fourth trains 401a to 401d, and heat source supply lines L3a to L3d branched from the heat source supply line L3 may be connected to the first to fourth skids 401 to 404, respectively.

That is, in the related art, when the heat source supply lines L3 are connected to the vaporizers 40 constructed with four skids, respectively, eight lines (leading-in lines and leading-out lines) pass through the upper deck 104, so that durability of the upper deck 104 is degraded, but in the exemplary embodiment, only two heat source supply lines L3 formed of the common lines are formed when passing through the upper deck 104, so that there is an effect in that durability of the upper deck 104 is improved, and probability of a leakage of the heat source is decreased, thereby improving reliability of the system.

In this case, the heat source supply line L3 may be constructed with an additional line in parallel, and thus it is possible to sufficiently secure a flow amount of the glycol water accommodatable by one heat source supply line L3. In this case, the number of lines passing through the upper deck 104 may be four.

In the exemplary embodiment of the present invention, the intermediate heat medium supply apparatus may be disposed in an order of the expansion tank 44, the seawater heat exchanger 41, the heat source pump 42, and the vaporizer 40 as illustrated in FIG. 8. In the related art, the intermediate heat medium supply apparatus are disposed in an order of the expansion tank 44, the heat source pump 42, the seawater heat exchanger 41, and the vaporizer 40, but the intermediate heat medium supply apparatus are disposed as illustrated in FIG. 8, so that allowable pressure of the seawater heat exchanger 41 is decreased, thereby achieving an effect in that construction cost of the seawater heat exchanger 41 is decreased.

Herein, the seawater heat exchanger 41 may be a heat exchanger in a scheme of a Printed Circuit Heat Exchanger (PCHE), and a pressure of glycol water flowing into the seawater heat exchanger 41 may be about 2.5 bars, a pressure of glycol water flowing into the heat source ump 42 from the seawater heat exchanger 41 may be about 0.5 bars, and a pressure of glycol water flowing into discharged from the heat source pump 42 may be about 15 bars. In this case, a pressure of seawater flowing into the seawater heat exchanger 41 may be about 2 to 3 bars.

Figure 9:
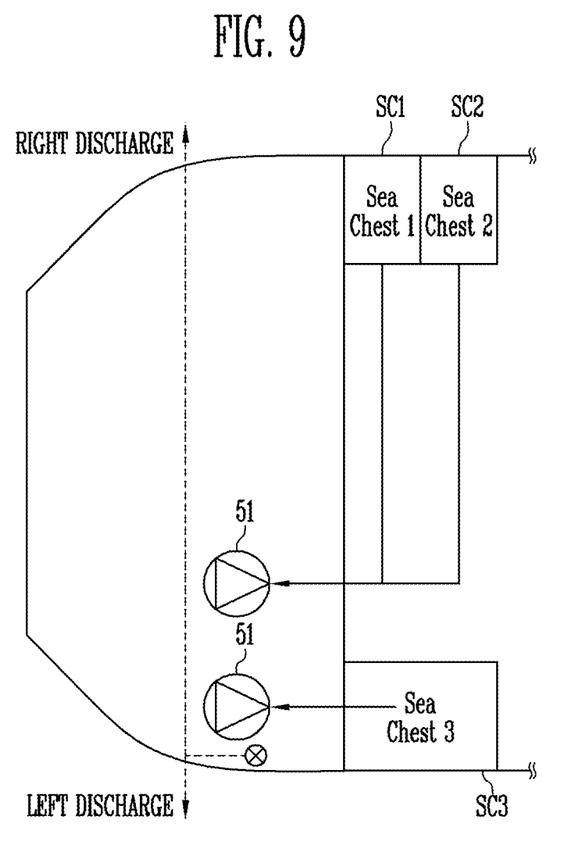
FIG. 9 is a conceptual diagram illustrating a seawater supply apparatus of the present invention.

FIG. 9 is a conceptual diagram illustrating a seawater supply apparatus of the present invention.

As illustrated in FIG. 9, sea chests SC1 to SC3, into which seawater flows, and a seawater pump 51 are provided in the seawater supply apparatus. The seawater supply apparatus of FIG. 9 may also be applied to the ship including the gas re-vaporizing system 4 illustrated in FIGS. 5 to 8, as well as the ship including the gas re-vaporizing systems 2 and 3 illustrated in FIGS. 2 to 4.

In a seawater supply apparatus in the related art, a sea chest, in which seawater flows, is disposed only at one side surface of the lowermost side of a ship body, and thus there is a concern that high-temperature seawater flows in due to a temperature of the seawater discharged from the gas re-vaporizing system.

In order to solve the problem, in the seawater supply apparatus according to the present exemplary embodiment, the sea chests SC1 to SC3 are disposed on both surfaces of the lowermost side of the ship body, the seawater is controlled to be discharged from the left surface of the ship body (left discharge in the drawing) when the seawater flows into a first sea chest (sea chest 1) SC1 and a second sea chest (sea chest 2) SC2, and the seawater is controlled to be discharged from the right surface of the ship body (right discharge in the drawing) when seawater flows into a third sea chest (sea chest 3) SC3, so that there is an effect in that it is possible to constantly secure a temperature of the seawater flowing in the sea chests SC1 to SC3.

Further, in the present exemplary embodiment, the sea chests SC1 and SC2 at the right side may be divided into two sea chests including the first sea chest SC1 and the second sea chest SC2 and be constructed. In this case, there is an effect in that it is possible to more constantly secure a temperature of the seawater flowing into the sea chest.

In the foregoing, the present invention has been described in detail through the particular exemplary embodiments, but the particular exemplary embodiments are for the purpose of describing the present invention in detail, and the present invention is not limited thereto, and it is apparent that those skilled in the art may make a modification or an improvement thereof within the technical spirit of the present invention.

All of the simple modifications or changes of the present invention belong to the scope of the range of the present invention, and the specific scope of the present invention may be apparent by the accompanying claims.

The invention claimed is:

1. A ship including a gas re-vaporizing system, the ship comprising:
  a ship body comprising an upper deck and a ship bottom, wherein an internal space of the ship body is positioned between the upper deck and the ship bottom;
  a vaporizer arranged in an upper portion of the upper deck of the ship body, the vaporizer configured to vaporize liquefied gas and supply the vaporized liquefied gas; and
  a heat source supply apparatus comprising a heat source pump configured to supply a non-explosive heat source to the vaporizer and a seawater heat exchanger configured to heat-exchange the heat source and seawater; and
  a seawater supply apparatus comprising a seawater pump configured to supply the seawater to the seawater heat exchanger,
  wherein the heat source supply apparatus and the seawater supply apparatus are arranged in the internal space of the ship body positioned between the upper deck and the ship bottom of the ship body,
  wherein one or more heat source supply lines passing through the upper deck of the ship body are connected between the vaporizer and the heat source supply apparatus, and
  wherein one or more seawater lines are connected between the seawater pump and the seawater heat exchanger.

2. The ship of claim 1, further comprising:
  at least one inner deck which vertically divides the internal space of the ship body.

3. The ship of claim 2, wherein the heat source supply apparatus further includes:
  a heat source circulation line, which is provided with the heat source pump and the seawater heat exchanger, and one of the heat source pump and the seawater heat exchanger is disposed above the inner deck, and the other of the heat source pump and the seawater heat exchanger is disposed below the inner deck.

4. The ship of claim 3, wherein the heat source circulation line has a smaller diameter than a diameter of the seawater line.

5. The ship of claim 4, wherein the seawater line has one end, which is connected to a seawater inlet formed on a lateral surface of the ship body, and the other end, which is connected to a seawater outlet formed on a lateral surface of the ship body, and
  the heat source supply apparatus is disposed in a section inside the ship body, in which the seawater outlet is provided.

6. The ship of claim 4, wherein the seawater pump is disposed at a stern side inside the ship body.

7. The ship of claim 3, further comprising:
  a steam heat exchanger configured to heat-exchange the heat source and steam,
  wherein the heat source pump is disposed below the inner deck, and the seawater heat exchanger and the steam heat exchanger are disposed above the inner deck.

8. The ship of claim 7, further comprising:
  a boiler configured to generate the steam and disposed in an engine room in the internal space of the ship body; and
  a steam line configured to connect the steam heat exchanger and the boiler so that the steam circulates the steam heat exchanger and the boiler,
  wherein the steam line is arranged in at least a part of the ship bottom of the ship body.

9. The ship of claim 8, wherein the steam is heat-exchanged with the heat source next to the seawater.

10. The ship of claim 7, wherein the heat source supply apparatus is manufactured in a module so as to include the heat source pump, the seawater heat exchanger, and the steam heat exchanger.

11. The ship of claim 1, wherein the heat source supply apparatus is disposed at a stern side inside the ship body.

12. The ship of claim 1, wherein the heat source supply apparatus is disposed in the internal space of the ship body.

13. The ship of claim 12, wherein the heat source supply apparatus is disposed on a lateral surface of an engine room, which is disposed inside a stern of the ship body.

14. The ship of claim 1, wherein the heat source is glycol water.

15. The ship of claim 3, wherein the heat source supply apparatus includes a pressure maintaining device disposed in the internal space of the ship body, the pressure maintaining device configured to maintain a pressure of a heat source flowing within the heat source circulation line by using inert gas.

16. The ship of claim 3, further comprising:
  a steam heat exchanger configured to heat-exchange the heat source and steam,
  wherein the heat source pump is disposed above the inner deck, and the seawater heat exchanger and the steam heat exchanger are disposed above the inner deck.

* * * * *